United States Patent

Härle

[11] Patent Number: 5,092,826
[45] Date of Patent: Mar. 3, 1992

[54] ARC GEAR HAVING A ROTARY TRANSMISSION OF 1:1

[76] Inventor: Hermann Härle, Conchesstrasse 23, D-7960 Aulendorf, Fed. Rep. of Germany

[21] Appl. No.: 427,233

[22] Filed: Oct. 24, 1989

[30] Foreign Application Priority Data

Oct. 24, 1988 [CH] Switzerland ............... 3942/88

[51] Int. Cl.⁵ .............................. F16H 1/28
[52] U.S. Cl. ................... 475/180; 464/102; 74/462
[58] Field of Search ............ 475/180; 464/102, 137; 74/462

[56] References Cited

U.S. PATENT DOCUMENTS

| | | | |
|---|---|---|---|
| 3,602,615 | 8/1971 | Erwin | 475/180 X |
| 4,386,892 | 6/1983 | Stich et al. | 74/462 X |
| 4,679,465 | 7/1987 | Goto et al. | 475/180 |
| 4,827,800 | 5/1989 | Pedersen et al. | 74/462 X |
| 4,922,781 | 5/1990 | Peiji | 475/180 X |

FOREIGN PATENT DOCUMENTS

| | | | |
|---|---|---|---|
| 0043899 | 1/1982 | European Pat. Off. | |
| 2007853 | 8/1971 | Fed. Rep. of Germany | |
| 583166 | 1/1925 | France | 464/102 |
| 1278003 | 10/1961 | France | 464/102 |
| 60-136619 | 7/1985 | Japan | 464/102 |
| 447444 | 5/1936 | United Kingdom | 475/180 |
| 1198737 | 7/1970 | United Kingdom | 475/180 |

Primary Examiner—Leslie A. Braun
Assistant Examiner—Benjamin Levi

[57] ABSTRACT

The arc gear with a rotary transmission of 1:1 has an inner toothed toothwheel, an outer toothed toothwheel, each connected to a shaft, one of the shafts being for drive and one for output. The shafts are arranged eccentrically with an eccentricity and parallel to one another. There are provided concave power transmission surfaces, with a first radius of curvature measured from the centers of first circles, on teeth of one of the toothwheels, and convex power transmisison surfaces, with a second radius of curvature measured from the centers of second circles, on teeth of the other of the toothwheels, both of the toothwheels having the same number of power transmission surfaces. Two of the concave power transmission surfaces lie on the same one of the first circles. Two of the convex power transmission surfaces lie on the same one of the second circles. The first radius and the first circles are bigger than the second radius and the second circles. Between the two of the convex power transmission surfaces that lie on the same first circle are at least two other of the convex power transmission surfaces, and between the two of said concave power transmission surfaces that lie on the same second circle are at least two other of the concave power transmission surfaces. And the difference in length between the first radius and the second radius is the eccentricity.

10 Claims, 3 Drawing Sheets

ARC GEAR HAVING A ROTARY TRANSMISSION OF 1:1

The relates to an arc gear having a rotary transmission of 1:1.

BACKGROUND OF THE INVENTION

Such arc gears are used, for example, in the cyclo gear known to the specialists, for the 1:1 transmission (coupling) of the torque and the speed of the shaft rotating about its own axis eccentrically (or with a distance between centers) with respect to other shafts. The radius of the concave surfaces is preferably greater than that of the convex surfaces by a factor corresponding to the eccentricity (the distance between centers). Such a gear generally avoids the long design of a cardan shaft, which in fact is known to perform the same task in the case of shafts arranged virtually parallel. Such gears have recently also been used in hydrostatic rotary piston machines having a large intake volume, based on the so-called "orbit" principle for preventing rotating of one of the two elements of the displacement gear, which elements execute an eccentric movement, this being the case in particular when a so-called Eaton tooth system is provided.

"Eaton tooth system," as explained in European Patent 43899 refers to a gear system of an annular gear pump having a housing, an internally toothed annular gear-wheel with eight to sixteen teeth, rotatably mounted in the housing, and a pinion carried by a drive shaft. The pinion has one tooth less than the annular gear-wheel and meshes with the annular gear-wheel. The sealing between suction chamber and pressure chamber is effected opposite the point of deepest engagement of the gear-wheel by sliding of the tips of the teeth of the pinion on the teeth of the annular gear-wheel and at the point of deepest engagement of the gear-wheel by bearing of the driving flanks of the teeth of the pinion against the teeth of the annular gearwheel. Furthermore, the tips of the teeth of the pinion go freely in the gaps between the teeth of the annular gearwheel. The tooth profile of the pinion is defined by rolling thereof in the annular gear-wheel.

As mentioned above, an important advantage of such arc gears is their extremely short design and their ability, in the case of staggered shafts, to transmit the speed at each angle of rotation in an exactly constant manner from one shaft to another. However, the problem in the known embodiments is the large arc diameter required for the power transmission surfaces and the high Hertzian stresses at the points of engagement during transmission of high torques. Since, furthermore, the active engagement region of the power transmission surfaces is relatively small owing to the system, the required installation space is in the end very large compared with the benefit. This is also evident, for example, in the case of the gear according to German Offenlegungsschrift 2,007,853. To achieve a sufficiently high contact ratio there, the number of teeth must be increased. However, this automatically has the disadvantage once again that the diameter of the overall gear has to be increased and hence its size. In some gears, however, such a size increase is not acceptable, and it has therefore been necessary in such cases once again to rely on cardan solutions.

The term "cardan solution" refers to a gear with a universal or cardan joint, or a propeller shaft with universal joints, or a cardan shaft.

SUMMARY OF INVENTION

It is the object of the invention to improve a gear of this type by reducing the required installation space in the radial direction and substantially decreasing the Hertzian stresses. Hertzian stresses relate to the Hertzian stress equation. The compressive stress between two contacting convex curved surfaces, such as gear teeth, is proportional to the square-root of the load. This relationship is based on the well known Hertzian stress equation. An object of the invention is also to reduce the cost for the production of such gears. By advantageous formation of a lubrication film on the power-transmitting engagement points, it is moreover an object of the invention to improve the efficiency, the wear and, by an optimal contact ratio, the operating noise level.

These objects are achieved, according to the invention, by the following:

An arc gear with a rotary transmission of 1:1 has an inner toothed toothwheel, an outer toothed toothwheel, each connected to a shaft, one of said shafts being for drive and one for output. The shafts are arranged with an eccentricity between them and parallel to one another. There are provided concave power transmission surfaces, with a first radius of curvature measured from the centers of first circles, on teeth of one of said toothwheels, and convex power transmission surfaces, with a second radius of curvature measured from the centers of second circles, on teeth of said other of said toothwheels, both of said toothwheels having the same number of said Power transmission surfaces.

Two of said concave power transmission surfaces lie on the same one of said first circles. Two of said convex power transmission surfaces lie on the same one of said second circles. Said first radius and said first circles are bigger than said second radius and said second circles. Between said two of said concave power transmission surfaces that lie on the same first circle, are at least two other of said concave power transmission surfaces, and between said two of convex power transmission surfaces that lie on the same second circle are at least two other of said convex power transmission surfaces. And the difference in length between said first radius and said second radius is said eccentricity.

Expedient embodiments include the following additional inventive features:

All of said centers of said first circles lie on a third circle with a third radius, all of said centers of said second circles lie on a fourth circle with a fourth radius, and the ratio of said first radius to said third radius and the ratio of said second radius to said fourth radius is at least 30% in each case.

Power transmission surfaces of said outer toothwheel are arranged to engage power transmission surfaces of said inner toothwheel without slip, all of said centers of said first circles lie on a third circle with a third radius, all of said centers of said second circles lie on a fourth circle with a fourth radius, the ratio of said first radius to said third radius is at least 60%, and the ratio of said second radius to said fourth radius is at least 50%.

One of said shafts bears said concave power transmission surfaces and forms said inner toothwheel.

Said concave power transmission surfaces are essentially inside an arc that intersects said centers of said first circles and surrounds said concave power transmission surfaces.

Said convex power transmission surfaces are essentially inside an arc that intersects said centers of said second circles and surrounds said convex power transmission surfaces.

One of said shafts bears said convex power transmission surfaces and forms said inner toothwheel, the ratio of said second radius to a radius of said arc being more than 80%, and the ratio of said first radius to said radius of said arc being more than 70%.

Two power transmission surfaces are present on a lateral cylinder surface, and at least two teeth formed by mutually curved and adjacent power transmission surfaces are present within said lateral cylinder surface.

The lateral cylinder surfaces which are interpenetrating (in the gear according to the invention) and contain the power-transmitting, concave and convex working surfaces give rise to substantially greater radii of curvature at the points of engagement, so that the lubrication of the power transmission surfaces in contact with one another, or of the corresponding tooth flanks, is improved. Hence, the danger of material fatigue is diminished, heating is reduced and the formation of a stable lubrication film is improved. The contact ratio is optimal so that vibrations are prevented.

The consequence is a high load capacity of the gear and quieter operation. Furthermore, all space consuming regions of the lateral cylinder surfaces which form the tooth flanks are dispensed with as a result of the overlap, and the engaging peripheral regions remain. This is achieved by the following features:

Said shafts have axes, lateral cylinder surfaces form said concave and convex power transmission surfaces equal distances apart on said shafts, and said power transmission surfaces have ends remote from said shaft axes and form an edge at said remote ends corresponding to a line of intersection of two adjacent lateral cylinder surfaces.

The arc gear thus becomes a genuine toothed-wheel gear, in that the tooth-shape power-transmission surfaces form an inner tooth system and outer tooth system which engage one another without slip, as an inner toothed-wheel gear in which the two toothed wheels have the same number of teeth (zero tooth number difference). Depending on the intended use, the position of the central axis of the cylinders forming the operating surfaces is chosen differently relative to the line of engagement. In a gear having high torque transmission, it is advantageous for the engaging regions of the cylindrical power transmission surfaces (tooth flanks) to lie inside the arcs of the cylinders. This gives rise to triangular teeth on both wheels with a very stable tooth base. The radii of the cylinders can be chosen to be large without the dimensions of the gear becoming substantially larger. This gives rise to tooth flanks with a close fit and, as explained above, with a high load capacity.

If, on the other hand, it is required to produce a gear which occupies a very small amount of space, for example merely for control purposes, it is advisable for the engaging regions of the cylindrical power transmission surfaces (tooth flanks) to lie outside the arcs of the cylinders. This gives rise to concave tooth flanks in the case of the inner tooth system and convex tooth flanks in the case of the associated outer tooth system, but the outer teeth become thin. Such a gear is thus suitable only for the transmission of small torques, as required, for example, for driving a rotary commutator in the hydrostatic rotary piston machines mentioned at the outset.

Of course, it is not necessary for each of the two gear shafts in the gear to be arranged rotatably about its axis. Thus, for example, the hollow wheel may be part of the stationary gear housing, so that the counter-wheel having outer teeth can execute only an eccentric movement but not a rotary movement about its own axis. In cyclo gears having high eccentricity or ia the above-mentioned hydrostatic rotary piston gears having a large intake volume, the gear according to the invention then performs a function of transmitting the moment of reaction to the housing.

An expedient additional embodiment includes the following additional features:

Said concave power transmission surfaces are essentially outside an arc that intersects said centers of said first circles and is surrounded by said power transmission surfaces.

Said convex power transmission surfaces are essentially outside an arc that intersects said centers of said second circles and is surrounded by said power transmission surfaces.

In the gear according to these features, an embodiment would be possible in which the hollow wheel also has a so-called trochoidal tooth system on the outer circumference, which tooth system engages a corresponding inner tooth system, which has one tooth more on the housing. If in this case the hollow wheel is forced to execute a circular movement by an eccentric shaft, the counter-wheel having outer teeth functions as a low-speed output shaft having high torque, as in the case of the above-mentioned cyclo gear.

Teeth are provided for each shaft. This feature defines a gear having an optimal arrangement with respect to size, contact ratio and power transmission. Two possible variants of this are shown in FIG. 4 and FIG. 6. However, any other numbers of teeth are of course possible within the framework of the invention.

BRIEF DESCRIPTION OF THE DRAWINGS

The drawing illustrates the invention by way of example in two preferred embodiments; in particular

DESCRIPTION OF PREFERRED EMBODIMENTS

Figure 2:
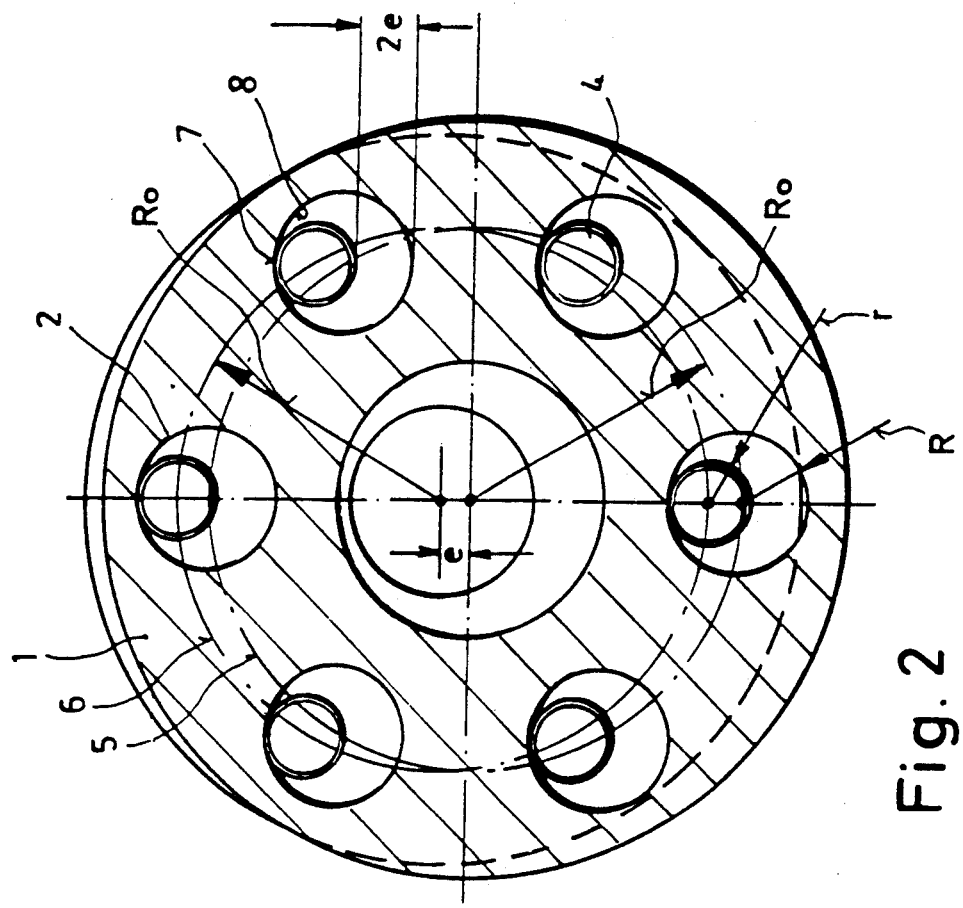
FIG. 2 shows a cross-section along the line 2—2 in FIG. 1.
Figure 1:
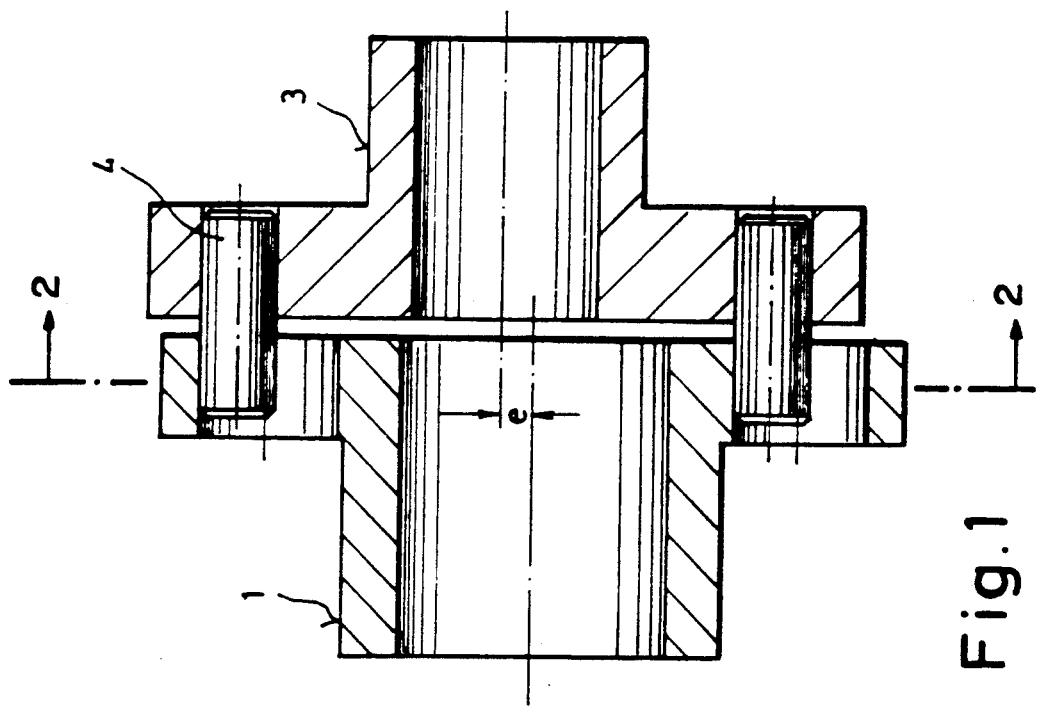
FIG. 1 shows a longitudinal section through a known gear from the prior art.

To illustrate the kinematic analogy of the gear according to the invention with the known form, the important features for the power transmission surfaces have been entered in FIG. 1 and FIG. 2, 1 denoting the driven shaft having the concave power transmission surfaces (8, 7'), in this case cylindrical holes of radius R. The output shaft 3 has the convex countersurface (7, 8') which interact with the surfaces (8, 7') and engage the latter, in the form of cylindrical pins 4 of radius r. The holes 2 and the pins 4 are preferably uniformly distributed over arcs 5 and 6 of radius Ro, both shafts and hence also the arcs being offset parallel by the eccentricity e (distance between centers). Since the diameter of the holes 2 is larger than the diameter of the pins 4 by a factor corresponding to twice the eccentricity, both shafts can be prevented from rotating about their own axis, despite the axial displacement. The pins 4 and the holes 2 ensure that both shafts always engage one another exactly at the same angle of rotation, provided that the transmission surfaces (7, 8) are free of play. The driven and output shafts are of course interchangeable.

In FIG. 3 to 6, the analogous elements for transmission of power and of angle of rotation from one shaft to the other are designated by the same letters as in FIGS. 1 to 2 of the known gear, thus indicating the same function. Here, the dash-dot circles of radii r and R indicate the pin diameter and hole diameter, respectively, of the cylindrical power transmission surfaces (7, 8) which engage one another. In the invention, however, these are actually tooth flank forms having the corresponding radii R and r, with the midpoints on theoretical arc radii 5, 6, which however lie outside the gear, having midpoints displaced by an amount corresponding to the eccentricity e. Because the theoretical cylinders of adjacent cylindrical surfaces penetrate one another, an inner tooth system and an outer tooth system are formed in both shaft pieces, i.e. an inner toothed-wheel gear having zero difference in the number of teeth and a transmission of 1 : 1.

Figure 6:
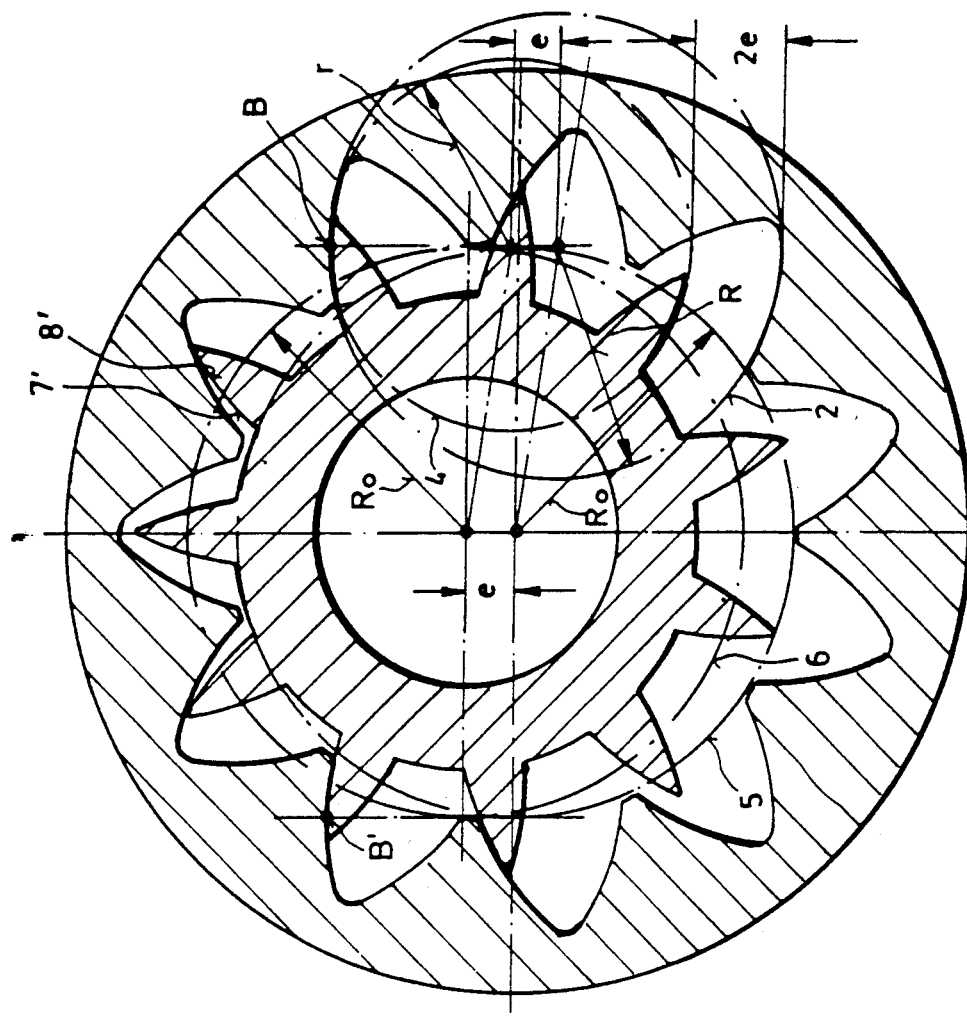
FIG. 6 shows a cross-section along the line 6—6 of FIG. 5.
Figure 5:
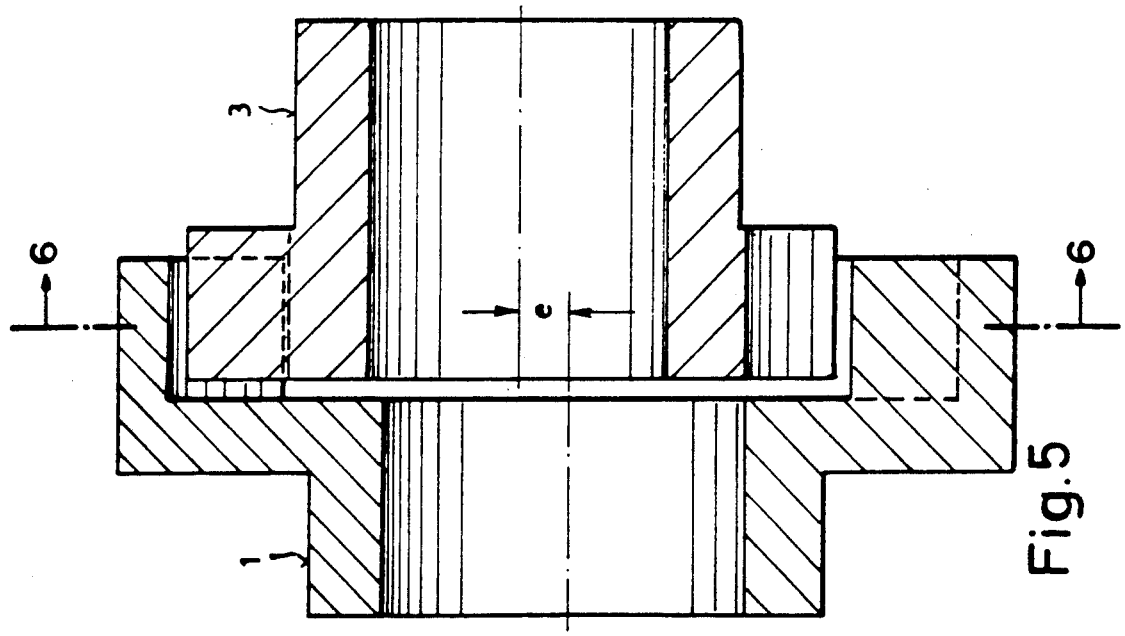
FIG. 5 shows a longitudinal section through a second possible embodiment.

In FIG. 6, the arcs 5 and 6 are once again inside the gear. On the other hand, the concave or convex form of the tooth flanks are the opposite of that according to FIG. 4. As is evident from FIG. 4 and 6, the designer must choose the ratios of the radii Ro, e, R and r in such a way that as far as possible real contact (engagement) points B and B' occur at any angle, which is certainly not the case for any chosen ratio. Thus, as is usually the case with other gears, such a gear must be "designed" according to size, eccentricity and number of teeth in order to achieve optimal engagement conditions.

As is very clearly evident from these two Figures, excellent intermeshing of the tooth flanks is acheived at the points of engagement B and B' which arise from contact of the radii R or r of the tooth flanks. In practice, it may therefore be assumed that useful engagement conditions prevail even when the theoretical contact point (B, B') is slightly outside the active tooth flank. These conditions can occur when the design is subject to constraints which do not permit an optimal design, for example in the case of excessively high eccentricity with a given arc Ro.

Figure 4:
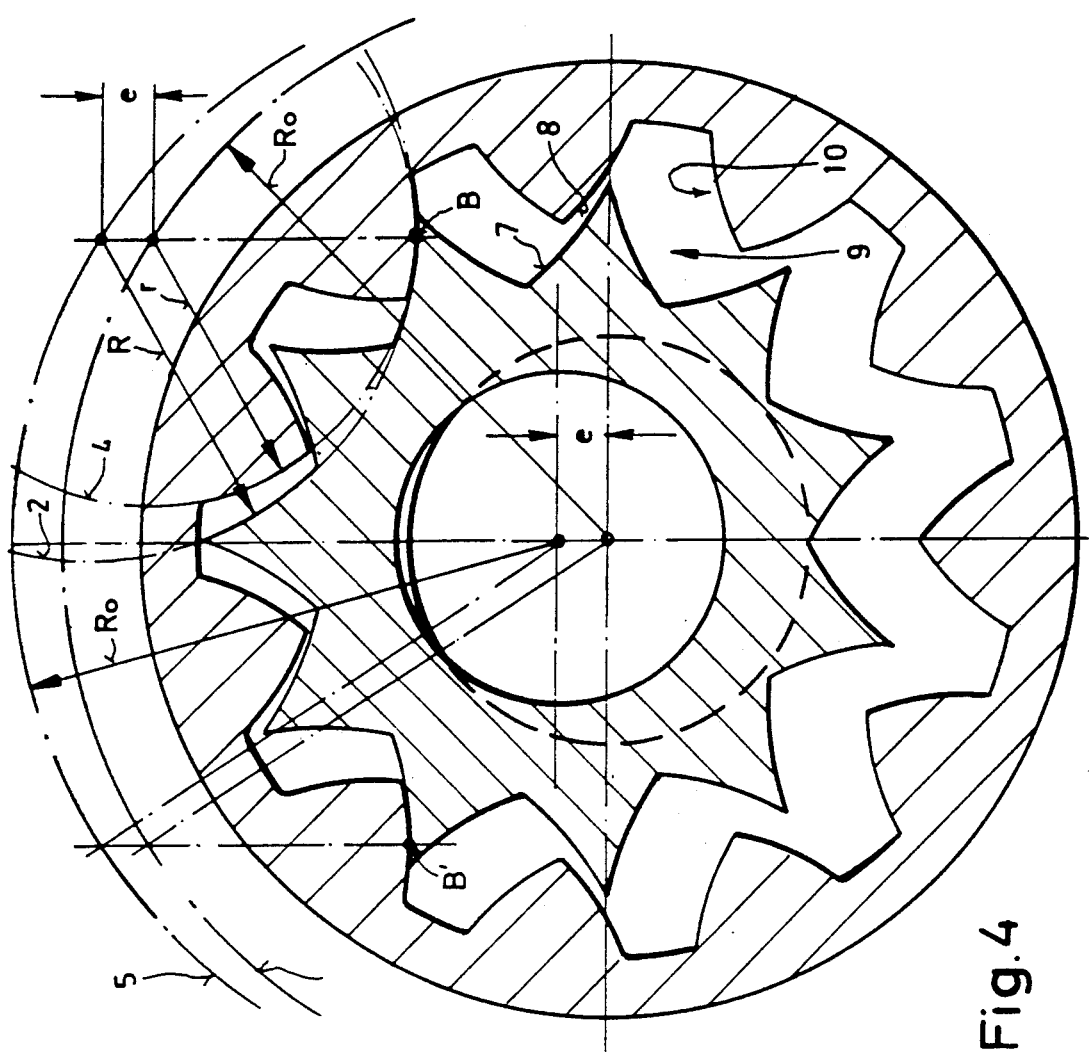
FIG. 4 shows a cross-section along the line 4—4 in FIG. 3.
Figure 3:
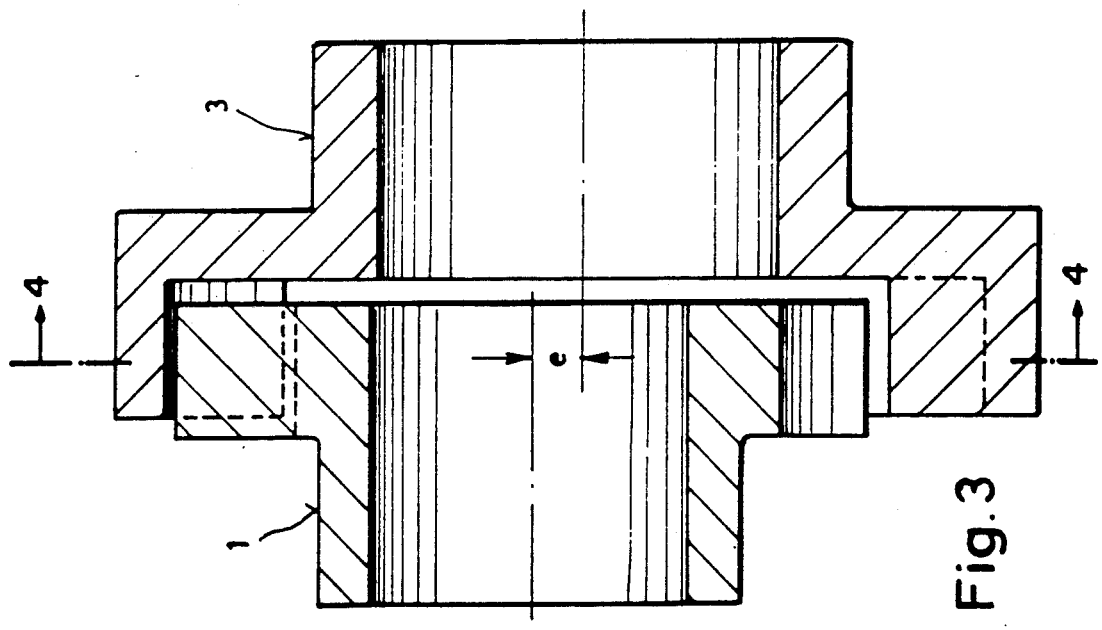
FIG. 3 shows a longitudinal section through a first embodiment of the gear according to the invention.

In the embodiment according to FIG. 4, the radius R spans only two hollow-wheel teeth, which is not inevitable. It may also span three or more teeth. A similar situation also applies to the gear according to FIG. 6.

The invention also embraces many more possible variants and applications. Its use, already indicated, for driving the rotary commutator in hydrostatic or aerostatic rotary piston machines should be considered only as an example. Here, for example, the hollow wheel having outer teeth in FIG. 6 will be part of the rotary piston. For example, an aerostatic or hydrostatic rotary piston machine in which the hollow wheel is analogous to FIG. 4 would also be possible, and the rotary piston is present on the driven or output shaft of the rotary commutator. The gyratory cardan shafts conventionally used in the past in such machines can thus be dispensed with.

The means for axial fixing of the position of the driven shaft and output shaft with respect to one another, which arises from the conversion of a complete plant or machine, is not shown since it is familiar to any skilled worker.

I claim:

1. An arc gear arrangement with a rotary transmission of 1:1 comprising an inner toothed toothwheel, an outer toothed toothwheel,
   said inner toothed toothwheel and said outer toothed toothwheel each being connected to a shaft, one of said shafts being for drive and the other for output,
   said shafts being arranged with an eccentricity between them and parallel to one another,
   the teeth of one of said toothed toothwheels have a plurality of concave power transmission surfaces with a first radius of curvature measured from the centers of a plurality of first circles, and
   the teeth of the other of said toothed toothwheels have a plurality of convex power transmission surfaces with a second radius of curvature measured from the centers of a plurality of second circles,
   both of said inner and outer toothed toothwheels having the same number of power transmission surfaces, wherein
   two of said concave power transmission surfaces lie on a single one of said first circles,
   two of said convex power transmission surfaces lie on a single one of said second circles,
   said first radius of curvature of said first circles are greater than said second radius of curvature of said second circles,
   between said two of said concave power transmission surfaces that lie on the same first circle are at least two other of said concave power transmission surfaces, and between said two of said convex power transmission surfaces that lie on the same second circle are at least two other of said convex power transmission surfaces, and
   the difference in length between said first radius of curvature and said second radius of curvature is said eccentricity.

2. An arc gear as claimed in claim 1, wherein all of said centers of said first circles lie on a third circle with a third radius of curvature, all of said centers of said second circles lie on a fourth circle with a fourth radius of curvature, and the ratio of said first radius of curvature to said third radius of curvature and the ratio of said second radius of curvature to said fourth radius of curvature is at least 30% in each case.

3. An arc gear as claimed in claim 1, wherein two power transmission surfaces are present on a lateral cylinder surface, and at least two teeth formed by mutually curved and adjacent power transmission surfaces are present within said lateral cylinder surface.

4. An arc gear as claimed in claim 3, wherein teeth are provided for each shaft.

5. An arc gear as claimed in claim 1, wherein said shafts have axes, lateral cylinder surfaces form said plurality of concave and convex power transmission surfaces equal distances apart on said shafts, and said a plurality of concave and convex power transmission surfaces have ends remote from said shaft axes and form an edge at said remote ends corresponding to a line of intersection of two adjacent lateral cylinder surfaces.

6. An arc gear arrangement with a rotary transmission of 1:1 comprising an inner toothed toothwheel, an outer toothed toothwheel, said inner toothed toothwheel and said outer toothed toothwheel each being connected to a shaft, one of said shafts being for drive and the other for output, said shafts being arranged with an eccentricity between them and parallel to one another, the teeth of one of said toothed toothwheels have a plurality of concave power transmission surfaces with a first radius of curvature measured from the centers of a plurality of first circles, and the teeth of the other of said toothed toothwheels have a plurality of convex power transmission surfaces with a second radius of curvature measured from the centers of a plurality of second circles, both of said inner and outer toothed toothwheels having the same number of power transmission surfaces, wherein two of said concave power transmission surfaces lie on a single one of said first circles, two of said convex power transmission surfaces lie on a single one of said second circles, said first radius of curvature of said first circles are greater than said second radius of curvature of said second circles, between said two of said concave power transmission surfaces that lie on the same first circle, are at least two other of said concave power transmission surfaces, and between said two of said convex power transmission surfaces that lie on the same second circle are at least two other of said convex power transmission surfaces, the difference in length between said first radius of curvature and said second radius of curvature is said eccentricity, power transmission surfaces of said outer toothed toothwheel are arranged to engage power transmission surfaces of said inner toothed toothwheel without slip, all of said centers of said first circles lie on a third circle with a third radius of curvature, all of said centers of said second circles lie on a fourth circle with a fourth radius of curvature, and the ratio of said first radius of curvature to said third radius of curvature is at least 60%, and the ratio of said second radius of curvature to said fourth radius of curvature is at least 50%.

7. An arc gear arrangement with a rotary transmission of 1:1 comprising an inner toothed toothwheel, an outer toothed toothwheel, said inner toothed toothwheel and said outer toothed toothwheel each being connected to a shaft, one of said shafts being for drive and the other for output, said shafts being arranged with an eccentricity between them and parallel to one another, the teeth of one of said toothed toothwheels have a plurality of concave power transmission surfaces with a first radius of curvature measured from the centers of a plurality of first circles, and the teeth of the other of said toothed toothwheels have a plurality of convex power transmission surfaces with a second radius of curvature measured from the centers of a plurality of second circles, both of said inner and outer toothed toothwheels having the same number of power transmission surfaces, wherein two of said concave power transmission surfaces lie on a single one of said first circles, two of said convex power transmission surfaces lie on a single one of said second circles, said first radius of curvature of said first circles are greater than said second radius of curvature of said second circles, between said two of said concave power transmission surfaces that lie on the same first circle are at least two other of said concave power transmission surfaces, and between said two of said convex power transmission surfaces that lie on the same second circle are at least two other of said concave power transmission surfaces, and the difference in length between said first radius of curvature and said second radius of curvature is said eccentricity, further comprising at least one the following features:

said concave power transmission surfaces are partially outside an arc that intersects said centers of said first circles and is surrounded by said concave power transmission surfaces, and said convex power transmission surfaces are essentially outside an arc that intersects said centers of said second circles and is surrounded by said convex power transmission surfaces.

8. An arc gear as claimed in claim 7, wherein said one of said shafts connected to said toothed toothwheels bears said concave power transmission surfaces and forms said inner toothwheel.

9. An arc gear arrangement with a rotary transmission of 1:1 comprising an inner toothed toothwheel, an outer toothed toothwheel, said inner toothed toothwheel and said outer toothed toothwheel each being connected to a shaft, one of said shafts being for drive and the other for output, said shafts being arranged with an eccentricity between them and parallel to one another, the teeth of one of said toothed toothwheels have a plurality of concave power transmission surfaces with a first radius of curvature measured from the centers of a plurality of first circles, and the teeth of the other of said toothed toothwheels have a plurality of convex power transmission surfaces with a second radius of curvature measured from the centers of a plurality of second circles, both of said inner and outer toothed toothwheels having the same number of power transmission surfaces, wherein two of said concave power transmission surfaces lie on a single one of said first circles, two of said concave power transmission surfaces lie on a single one of said second circles, said first radius of curvature of said first circles are bigger than said second radius of curvature of said second circles, between said two of said concave power transmission surfaces that lie on the same first circle are at least two other of said concave power transmission surfaces, and between said two of said convex power transmission surfaces that lie on the same second circle are at least two other of said convex power transmission surfaces, and the difference in length between said first radius of curvature and said second radius of curvature is said eccentricity, further comprising at least one the following features:

said concave power transmission surfaces are inside a first arc that intersects said centers of said first circles and surrounds said concave power transmission surfaces, and said convex power transmission surfaces are inside a first arc that intersects said centers of said second circles and surrounds said convex power transmission surfaces.

10. An arc gear as claimed in claim 9, wherein said one of said shafts connected to said toothed toothwheels bears said convex power transmission surfaces and forms said inner toothed toothwheel, the ratio of said second radius of curvature to a radius of curvature of said further arc being more than 80%, and the ratio of said first radius of curvature to a radius of curvature of said first arc being more than 70%.

* * * * *